United States Patent [19]

Brandstatter

[11] 3,924,073

[45] Dec. 2, 1975

[54] HOME INTERCOM TELEPHONE SET

[76] Inventor: Horst Brandstatter, Vestner Str. 7, Zirndorf, Germany

[22] Filed: Sept. 26, 1974

[21] Appl. No.: 509,540

[52] U.S. Cl. .......... 179/1 H; 179/100 R; 179/158 R

[51] Int. Cl.[2] ........................ H04M 1/02; H04M 1/08

[58] Field of Search ................179/1 H, 1 HF, 100 R, 179/100 D, 100 L, 178, 179, 158 R, 160

[56] References Cited

UNITED STATES PATENTS

| | | | |
|---|---|---|---|
| 2,686,834 | 8/1954 | Gottlieb | 179/1 H |
| 2,686,835 | 8/1954 | Gottlieb | 179/1 H |
| 2,763,719 | 9/1956 | Schoeneberg | 179/1 H |
| 2,764,631 | 9/1956 | Heller | 179/1 H |
| 2,912,502 | 11/1959 | Talcott | 179/1 H |
| 3,126,454 | 3/1964 | Fresk et al. | 179/100 D |
| 3,345,466 | 10/1967 | Rahmig | 179/1 H |
| 3,594,515 | 7/1971 | Brown | 179/100 R |
| 3,657,487 | 4/1972 | Schwanck et al. | 179/100 R |

*Primary Examiner*—Kathleen H. Claffy
*Assistant Examiner*—Randall P. Myers

[57] ABSTRACT

The present invention concerns a toy telephone or home intercom in which the electrical parts and connections are prefabricated into a self-contained unit which can be detachably mounted in a telephone case.

6 Claims, 3 Drawing Figures

HOME INTERCOM TELEPHONE SET

The invention concerns a telephone, particularly a toy or home intercom, with a case designed to hold the receiver and having a reversing switch, actuated by replacing or removing the receiver, for switching from a talking to a ringing unit and with a selector for selecting the ringing unit of at least one other telephone.

In the production of these telephones, the manufacture and assembly of the switching devices, mostly designed as wire straps, and of their connecting lines in the case represent a considerable cost factor. Particularly aggravating is the fact that the selection of the best location for the plants for the manufacture of the case and of the receivers, which are most made of injection molded plastic parts, provides extremely unfavorable conditions regarding the manufacture and assembly of the electrical parts and connecting lines in the case, which require a great amount of manual labor. The labor costs for the assembly of the electrical parts and connecting lines in the case are much higher with optimum selection of the location of the continuous casting plant for the case parts, than in many other sectors, but, on the other hand, the costs of shipping the relatively bulky case parts to locations with lower labor costs for the assembly of the electrical parts in the case are prohibitive.

The invention is based on the problem of providing a telephone, particularly as a toy or home intercom, which can be produced simpler and cheaper and which permits particularly the utilization of the wage cost factor to reduce the assembly costs.

For the solution of this problem in a telephone of the above mentioned type according to the invention, it is provided that all electrical parts and connecting lines arranged in the case are combined to a prefabricated unit which can be inserted, preferably detachably, in the case.

In contrast to the present construction of all such telephones, where a plurality of jumper wires have to be bent, secured in the case bottom, and soldered with each other, the prefabricated unit in the embodiment according to the invention can be produced in so-called low-wage regions or low-wage countries without the shipping costs playing a great part because of the small size of the units, after which this unit merely has to be inserted in the case, which can be done in a very simple manner by using spring locks, etc.

With particular advantage the units can be already rigidly connected with the receiver cord and wired with its lines before it is inserted into the case, so that actually no electrical connections have to be established at all during the final assembly by soldering, etc.

Another simplification in the manufacture and assembly of a telephone according to the invention results from the fact that the ringing unit is arranged in the receiver, preferably combined with its loudspeaker part, since the construction of a ringing unit by arranging a second sound transmitter diaphragm on the side of the loudspeaker coil opposite the loudspeaker diaphragm requires much less work than the manufacture of a separate ringing unit forming a separate part.

The prefabricated unit according to the invention can be provided according to a further embodiment of the invention with a plug accessible from the outside through a recess in the case for plugging in the connecting cord to a second telephone.

Of particular importance in one design of a telephone according to the invention is providing apparatus where the selecting mechanism is a simple ringing key which, with the receiver replaced in the opposite telephone, connects its ringing unit to the current source of the calling telephone. For these telephones, a design is of advantage where the jumper wires in the case are inserted in outside bearing grooves of two parallel web plates of an insulating supporting plate, preferably made of plastic, so that the jumper wires form contact pins arranged opposite each other in pairs in the range of movement of spring elements arranged between the web plates to form electrical connecting stirrups, which can be turned by the switching or ringing key.

Spring elements which can be used with particular advantage are designed as substantially U-shaped spring wire stirrups which can be inserted with their bent-off ends in recesses of the supporting plate, while the jumper wire elements, which are inserted without adhesive or soldering joints, can be held together in the embodiment of the invention by a U-shaped rail of insulating material, particularly plastic, which embraces the web plates clampingly and serves to hold the jumper wires in the bearing grooves of the web plates, and whose base can form at the same time a limiting stop for the movement of at least one of the spring elements.

The plug for plugging-in the connecting cord for the second telephone can be formed in a particularly simple manner by U-shaped bendings of the corresponding jumper wires clamped in slotted sleeve extensions of the bearing plate.

The fastening of the receiver cord can be effected preferably by clamping means attached on the supporting plate.

In a particularly simple and advantageous manner the supporting plate can form the cover of a box, attached on the bottom of the case, which is open at the top for the insertion of batteries, so that at the same time a simple contacting of the batteries is made possible by the springlike bends of the corresponding jumper wires.

Other advantageous features and details of the invention will result from the following description of an embodiment, as well as on the basis of the drawings.

Figure 1:
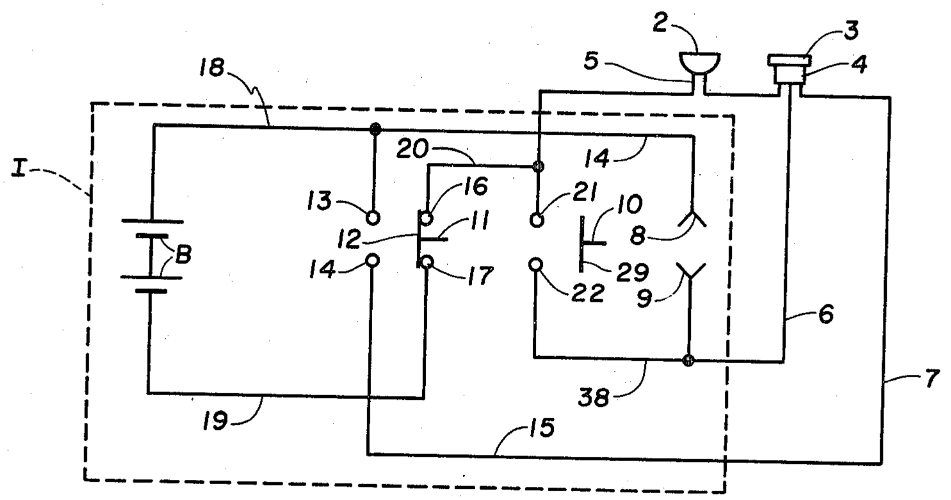
FIG. 1 shows the schematic circuit diagram of a telephone according to the invention.
Figure 2:
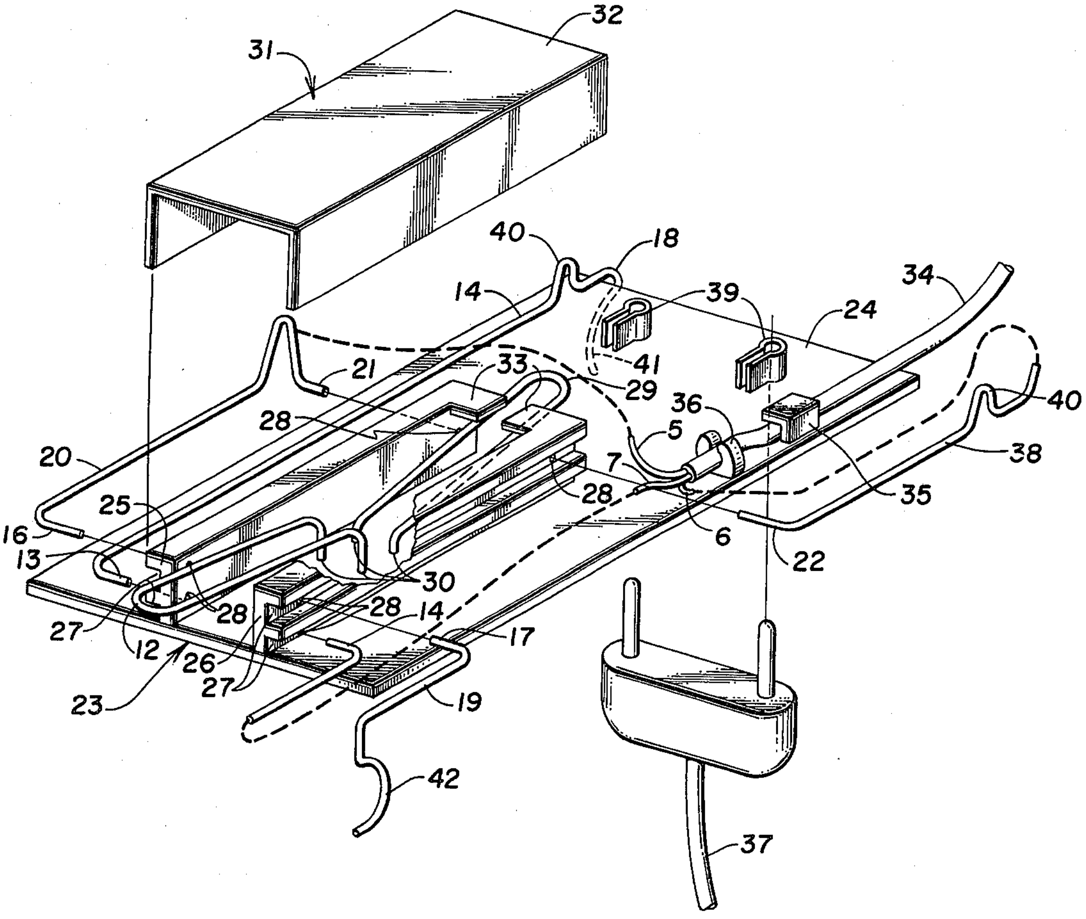
FIG. 2 shows a perspective exploded view of a unit according to the invention containing the electrical parts and connecting lines for the case, which only has to be anchored mechanically in the case.
Figure 3:
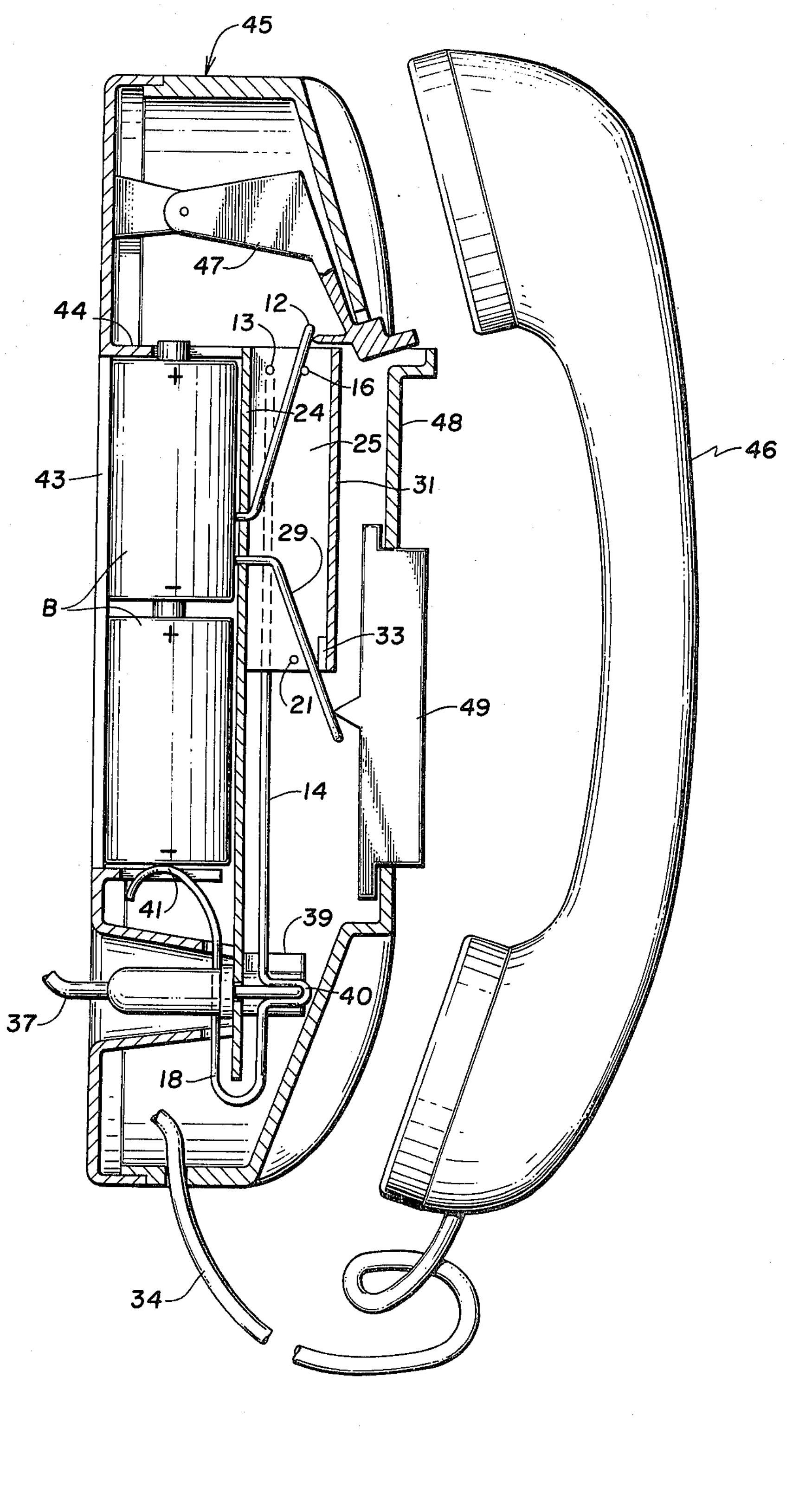
FIG. 3 shows a side elevation of a telephone according to the invention with a unit according to FIG. 2 in the housing cut along its longitudinal center plane.

The box I represented in broken lines in the circuit diagram according to FIG. 1 frames those parts and connecting lines of a telephone, with a ringing key for selecting the telephone to be called, which are arranged in the case, while the microphone 2, the loudspeaker 3 and the ringing units 4 are arranged in the receiver and are connected to the circuit in the case by means of the connecting lines 5, 6 and 7 combined in a receiver cord, 8 and 9 are the terminals where two telephone apparatus forming a set are to be electrically connected with each other, 10 is the ringing key and 11 the reversing key for a switching device switching from talking to the ringing unit 4.

[redacted]

into an electrical circuit including the speaking unit of the second telephone when its reversing key is in the second position and for connecting said selector device into an electrical circuit including the ringing unit of the second telephone when its reversing key is in its first position, wherein said switching device and said receiver cooperate with said reversing key to move said reversing key into its first position when said receiver is held by said case and establish electrical connection between said second pair of opposing contact pins by moving said switching device against its normal bias and to move said reversing key into its second position when said receiver is removed from said case and establish electrical connection between said third pair of opposing contact pins by permitting said switching device to move according to its normal bias.

2. The telephone recited in Claim 1 wherein:

said web plates are formed with outwardly facing bearing grooves;

said dimensionally stable wire stirrups are disposed in said grooves; and said first and second spring elements are U-shaped and have their ends disposed in bores in said supporting plate.

3. The telephone recited in claim 2 wherein said prefabricated unit further includes a rail having a U-shaped cross-section wherein the legs of said U-shaped cross-section extend over said web plates to hold said wire stirrups in place and the cross-member of said U-shaped cross-section cooperates with said selector device to limit the movement thereof.

4. The telephone recited in claim 1 wherein said ringing unit is assembled in said receiver with said loudspeaker.

5. The telephone recited in claim 1 wherein said means for electrically connecting the second telephone to said electrical connecting lines includes a plug receptacle in said supporting plate for receiving a plug from a second telephone, said plug receptacle including a pair of U-shaped bends in said wire stirrups held in place by lugs formed in said supporting plate.

6. The telephone recited in claim 1 wherein said means for connecting a current source to said electrical connecting lines includes a recess in said supporting plate for accepting at least one battery.

* * * * *